Figure 1:
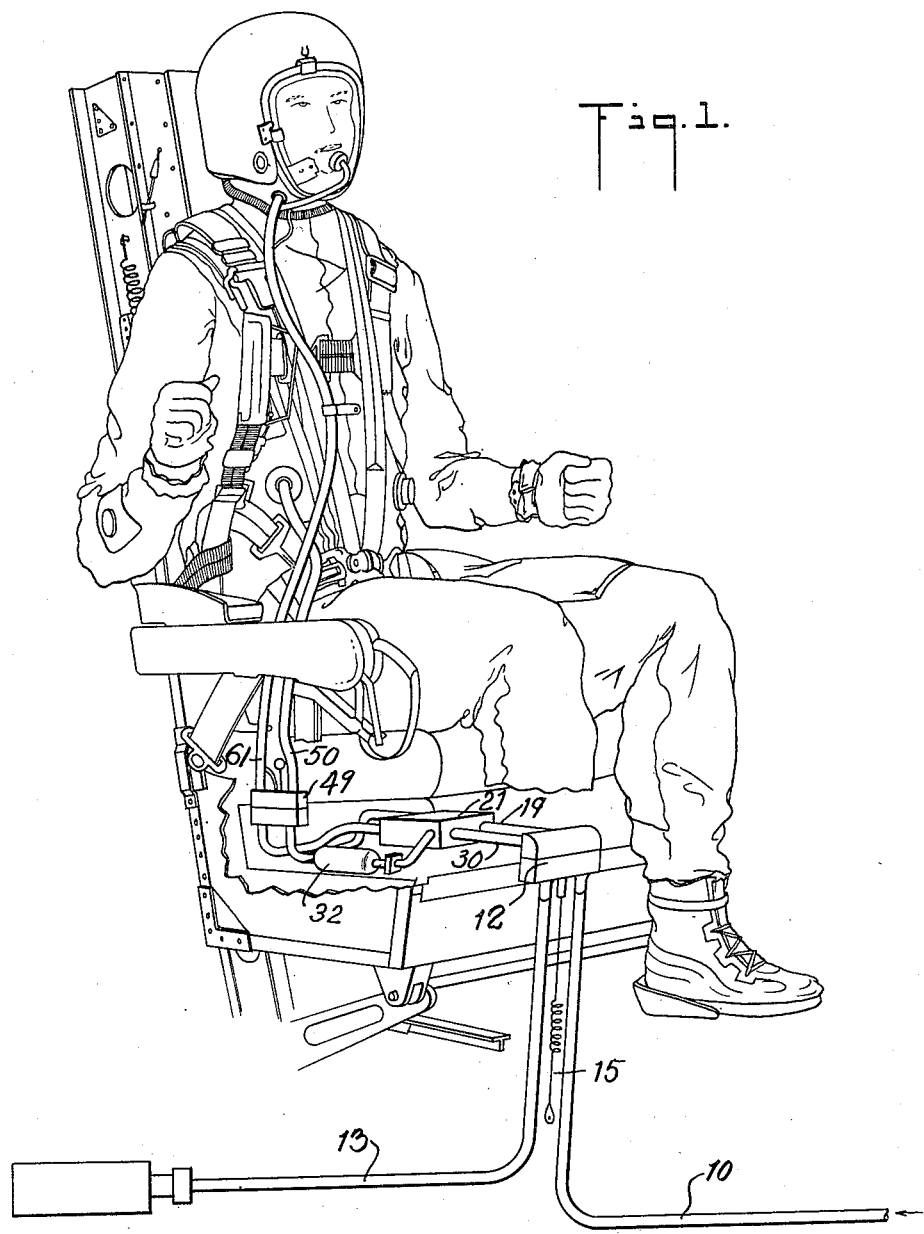

Feb. 25, 1958　　　　J. G. MEJEAN ET AL　　　　2,824,557
CONTROL APPARATUS FOR THE AIR AND OXYGEN SUPPLY
IN THE SUITS OF AIRCRAFT PERSONNEL
Filed Aug. 23, 1956　　　　　　　　　　　　　　4 Sheets-Sheet 3

INVENTOR.
JACQUES G. MEJEAN
BY　JOHN V. OLIVEAU

ATTORNEY

Feb. 25, 1958 J. G. MEJEAN ET AL 2,824,557
CONTROL APPARATUS FOR THE AIR AND OXYGEN SUPPLY
IN THE SUITS OF AIRCRAFT PERSONNEL
Filed Aug. 23, 1956 4 Sheets-Sheet 4

INVENTOR.
JACQUES G. MEJEAN
JOHN V. OLIVEAU
BY
ATTORNEY

United States Patent Office 2,824,557
Patented Feb. 25, 1958

2,824,557

CONTROL APPARATUS FOR THE AIR AND OXYGEN SUPPLY IN THE SUITS OF AIRCRAFT PERSONNEL

Jacques G. Mejean and John V. Oliveau, Greenwich, Conn., assignors to The Aerotec Corporation, Greenwich, Conn., a corporation of Connecticut Application August 23, 1956, Serial No. 605,794

10 Claims. (Cl. 128—142)

Our invention relates to apparatus for supplying, from the aircraft, oxygen to the helment and air to the suit of aircraft personnel when at a high altitude, such for example as 25,000 feet and higher, and for supplying oxygen from the aircraft or from an emergency supply carried by the suit when the aircraft air supply fails or when the suit is disconnected from the aircraft in bailing out. Our invention maintains the air and oxygen, respectively, at predetermined pressures relative to the ambient atmospheric pressure and relative to each other.

When the apparatus of our invention is connected to the air and oxygen supplies of the aircraft, the air is maintained at a pressure somewhat above the pressure of the ambient atmosphere so that the air may flow through the suit and ventilate it and the oxygen is supplied to the helmet at a pressure slightly above that at which the air is supplied to the suit. The oxygen and air are supplied through separate passages but in case of a failure of the air supply, a passage is opened from the oxygen passage to the air passage so that both passages may be supplied from the aircraft oxygen supply. Suitable control valves maintain the desired pressure differential between the oxygen and air delivery passages to the helmet and suit, respectively.

When the pilot or other personnel bails out of the aircraft the passages are separated from the aircraft supplies at a disconnect and are closed from the atmosphere by suitable valves and a valve is opened in a passage connecting the air and oxygen passages. At the same time the emergency oxygen supply carried by the suit is opened to these passages.

The suit is vented through a vent valve set to open at a definite suit pressure which permits air to escape at a definite pressure level. The control valve system is arranged to supply air up to a limited maximum flow at a pressure above that of the suit vent. The pressure of the air supply to the apparatus, 5 to 10 pounds per square inch for example, is much lower than that at which oxygen is supplied from the aircraft supply or the emergency supply, generally 50 to 70 pounds per square inch, and the regulating system is such that oxygen will be supplied to the suit at a pressure below the pressure set for the suit vent valve so that no venting of oxygen occurs. Venting of oxygen from the helmet exhaling is controlled to be slightly above that at which the oxygen is supplied to the helmet and independent of the pressure of the ambient atmosphere.

Figure 2:
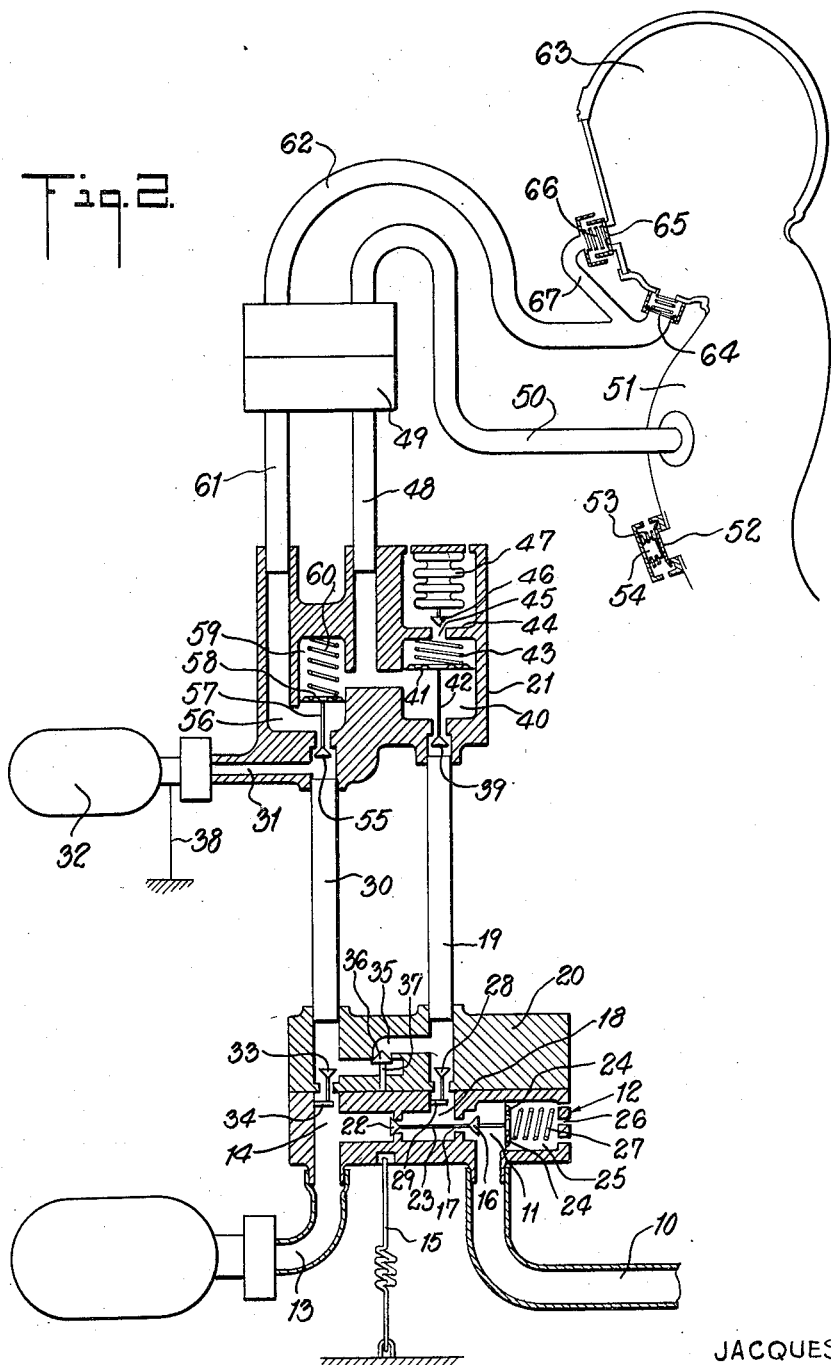
Figure 3:
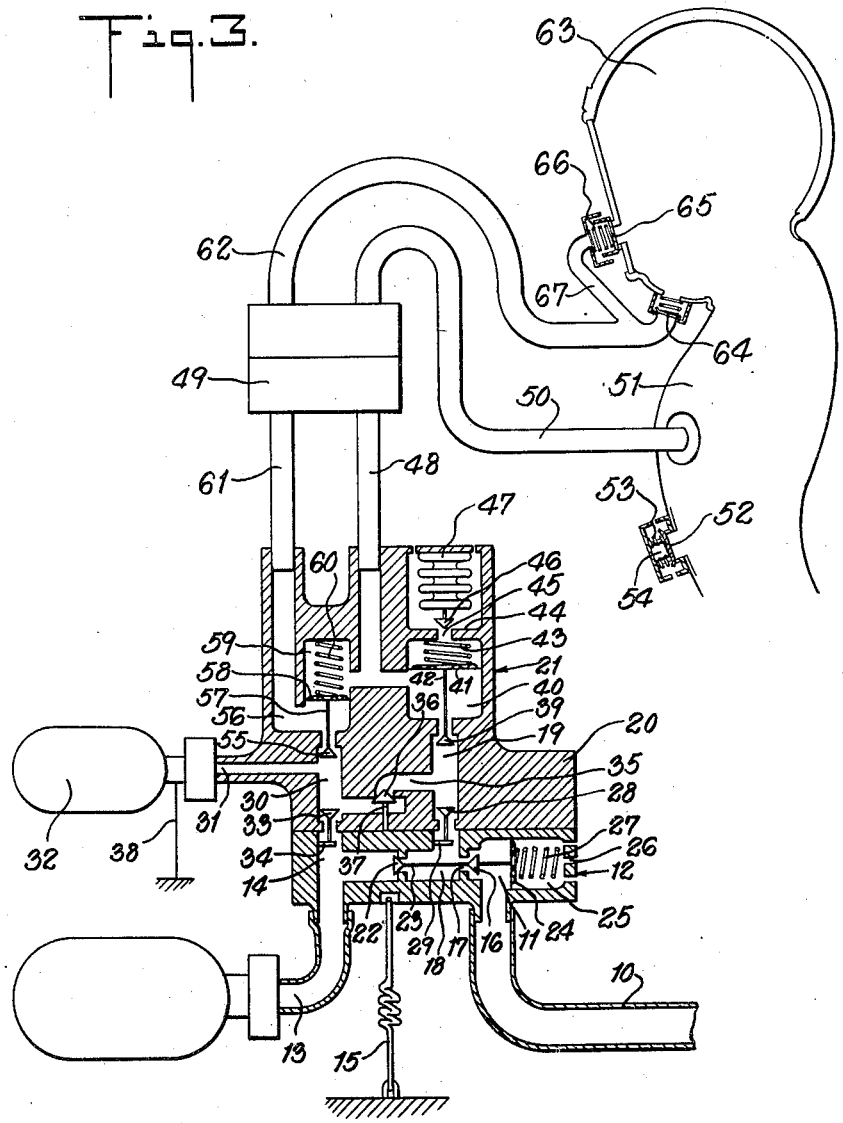
Figure 4:
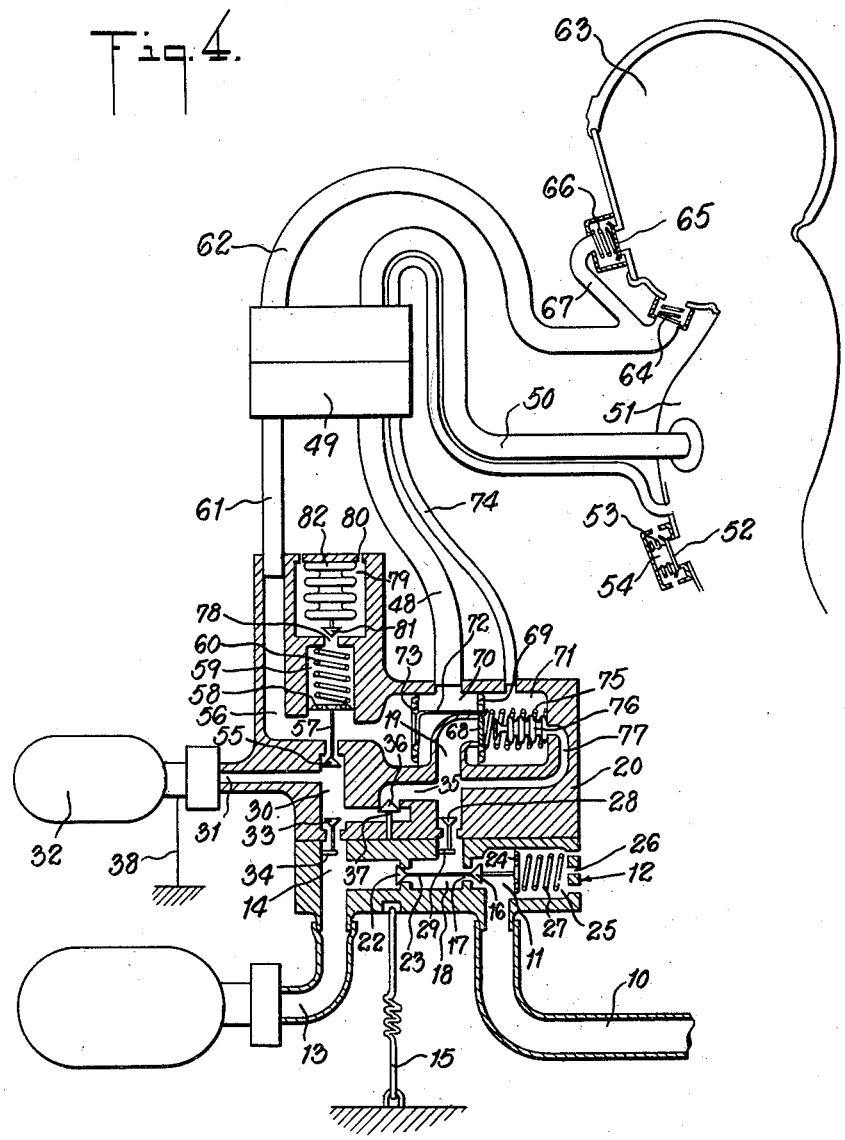

The various features of our invention are illustrated by way of example in the accompanying drawings, in which Fig. 1 is a perspective drawing of a suit and helmet equipped with the control apparatus of our invention, Fig. 2 is a diagrammatic sketch showing the arrangement of the conduits and control valves of apparatus embodying our invention, Fig. 3 is a similar sketch showing a modified form of embodiment, and Fig. 4 is a similar sketch showing a still further modified form of embodiment.

Referring more particularly to Figs. 1 and 2, air under pressure is supplied from the aircraft supply through a conduit 10 to an air inlet chamber 11 in the lower part 12 of a disconnect and oxygen under greater pressure is supplied from the aircraft supply conduit 13 of the aircraft supply to an oxygen inlet chamber 14 of the part 12. The part 12 is attached to the aircraft by means of a lanyard 15 coiled to permit a limited movement for adjustment of the position of the seat.

From the inlet chamber 11 the air passes past a valve 16 through a valve port 17 into a supply chamber 18 which delivers into a conduit 19 extending from the upper part 20 of the disconnect to a pressure regulator 21. The supply chamber 18 is connected to the oxygen inlet chamber 14 through a valve 22 connected by a rod 23 to the valve 16 in such manner as to close the passage to the oxygen chamber 14 when the valve 16 is open and to open this passage when the valve 16 is closed. The valve 16 is normally held open and the valve 22 closed by the air pressure in the chamber 11 acting against a spring pressed diaphragm 24, the other side which is exposed to the ambient atmospheric pressure through a recess 25 open to the atmosphere through openings 26 and containing the spring 27. Upon failure of the air supply the spring 27 biases the valve 16 to closed position and the valve 22 to open position to supply oxygen from the chamber 14 to the chamber 18 and conduit 19. Upon entering the conduit 19 the air or oxygen passes a check valve 28 held open by a stop 29 when the upper and lower parts 20 and 12 are assembled but closing when the upper part separates from the lower part to close the conduit 19 from the atmosphere.

The oxygen inlet chamber 14 is similarly connected to a conduit 30 to the pressure regulator 21 and also through a branch 31 to an emergency oxygen supply cylinder 32. On entering the conduit 30 the oxygen passes a valve 33 held open by a stop 34 when the parts 12 and 20 are assembled but closing when they are disconnected to close the conduit 30 from the atmosphere. The conduits 19 and 30 are connected by a passage 35 normally closed by a valve 36 having a stem 37 which abuts the lower part 12 to hold the valve closed when the parts of the disconnect are assembled but which is drawn open when they are disconnected. The emergency oxygen cylinder 32 is normally closed to the branch 31 but is opened by a lanyard 38 secured to the aircraft when the pilot bails out and the suit and upper part of the disconnect and conduits separate from the aircraft.

Normally air is supplied from the aircraft supply to the conduit 19 through the disconnect and oxygen is supplied to the conduit 30 from the aircraft oxygen supply. In the event of failure of the air supply valve 16 closes and valve 22 opens and both conduits 30 and 19 are supplied from the aircraft oxygen supply. When the parts 12 and 20 are disconnected the valves 28 and 33 close and the valve 36 opens and oxygen is supplied to both conduits 19 and 30.

Air or oxygen supplied by the conduit 19 to the pressure regulator 21 passes through an inlet valve 39 to a chamber 40 at a reduced pressure. The pressure in the chamber 40 is controlled by a diaphragm 41 to which the valve 39 is connected by a stem 42 and which is acted on by the pressure in the chamber 40 to close the valve. The diaphragm is biased in a direction to open the valve 39 by a spring 43 confined between the diaphragm and a partition 44 in the pressure regulator and by the pressure of the ambient atmosphere admitted through an opening 45 in the partition. The spring 43 is so designed as to maintain a pressure in the chamber 40 slightly above the ambient atmospheric pressure, for example 4 to 5 inches of water above the ambient atmospheric pressure, until an altitude of about 25,000 feet is reached. When this altitude is reached or at about this altitude, the opening 45 is closed by a valve 46 acted on by an evacuated bellows 47 having an internal pressure sufficient to close the valve at an altitude of about 25,000 feet. Thereafter the diaphragm is acted on by the spring and the pressure of the atmosphere trapped at 25,000 feet so that the pressure in the chamber 40 is maintained slightly, 4 to 5 inches of water, above the ambient pressure at about 25,000 for all altitudes above this.

Air or oxygen passes from the chamber 40 to a conduit 48 leading to a convenience disconnect 49 and thence through a conduit 50 to the suit 51 to be pressurized and ventilated. The purpose of the convenience disconnect is to permit the suit and helmet to be disconnected from the pressure regulator and supply system when the pilot leaves the aircraft and to be readily connected when he is in the aircraft and ready to take off. Air is vented from the suit through a vent valve 52.

For all altitudes up to about 25,000 feet the pressure at which air is supplied to the suit from the aircraft air supply will be 4 to 5 inches of water above that of the ambient atmosphere and above 25,000 the pressure at which the air is supplied to the suit will be 4 to 5 inches of water above the ambient air pressure at 25,000 or about 5.45 pounds per square inch and will be constant at this pressure. The suit vent valve 52 is loaded by a spring 53 to vent at a pressure between 4½ and 5 inches of water above ambient atmospheric pressure up to 25,000 feet of altitude. Above 25,000 feet, the pressure of the air in the suit must remain constant as the ambient pressure continues to decrease with increasing altitudes and for this purpose an evacuated bellows 54 is provided which, starting at 25,000 feet will progressively load the suit exhaust valve 52 so that under no conditions will the suit be subjected to a maximum pressure of six pounds per square inch above ambient pressure. The valve will vent under suit pressures above this and will pass a predetermined volume of air, as for example, 400 litres of air per minute.

When upon failure of the aircraft air supply, the conduits 19, 48 and 50 are supplied from the aircraft oxygen supply, or upon being disconnected from the aircraft, from the emergency oxygen supply, it is undesirable to vent oxygen from the suit. As the oxygen is supplied at a higher pressure than the air, 50 to 70 pounds per square inch as against 5 to 10 pounds per square inch, it will exert a greater pressure against the inlet face of the valve 39 and will subtract accordingly from the pressure of the spring 43 reducing the pressure in the chamber 40 and to the suit to about 4 inches of water above ambient pressure which, being below that at which the valve 52 vents, will avoid venting of oxygen from the suit.

Oxygen for the helmet is supplied from the aircraft oxygen supply or from the emergency or bail-out oxygen supply and conduit 31 through the conduit 30 through an inlet valve 55 to a reduced pressure chamber 56 of the pressure regulator 21. The valve 55 is connected by a stem 57 to a diaphragm 58 between the chamber 56 and a chamber 59 connected to the air chamber 40 and conduit 48. The diaphragm 58 and valve 55 are biased to open position by the pressure of the chamber 40 and in addition by a spring 60 to maintain a pressure about 3 to 4 inches of water above the pressure in the chamber 40. Consequently the valve will open at pressures in the chamber 56 below this and close at pressures above it and will thus maintain a pressure of 3 to 4 inches of water above the supply of air or oxygen in the chamber 40 and the suit 51. Oxygen is supplied from the chamber 56 through a conduit 61 to the convenience disconnect 49 and conduit 62 to the helmet 63, entering the helmet through an inlet check valve 64. Oxygen is exhaled from the helmet through an outlet valve 65 against the action of a spring 66 and the pressure in the conduit 62 supplied through a branch 67 to a bellows, diaphragm or other pressure element, not shown. By this means the exhalation pressure is made independent of the ambient atmospheric pressure.

The modification shown in Fig. 3 is similar to that of Fig. 2 except that the upper part of the emergency disconnect is combined with the pressure regulator eliminating the conduits 19 and 30, corresponding parts being identified with corresponding reference numerals.

In the modification shown in Fig. 4 the connections from the aircraft air and oxygen supplies to the disconnect, the passages in the disconnect, the emergency oxygen supply and connections, the connections from the pressure regulator to the helmet and suit and the exhaust vent valves of the helmet and suit are similar to those of the preceding figures, the pressure regulator and the upper part of the emergency disconnect being in one piece as in Fig. 3 and similar parts are identified with similar reference numerals. In this modification suit pressure close to the exhaust valve is used as a sensing medium as suit pressure at this point may be of a lesser value than at suit inlet due to pressure drop through the ventilating garment and a truer indication of workable pressure protection may be obtained.

In the pressure regulator of this modification the passage 19 is turned through a right angle to vent horizontally for convenience and the passage of air or oxygen therethrough is controlled by a valve 68 carried by a diaphragm 69 spanning a receiving chamber 70 and separating it from an enclosed pressure chamber 71. The valve 68 is connected by a connector 72 to a diaphragm 73 separating the chamber 70 from the chamber 56 in the oxygen supply line. Accordingly a lowering of the pressure in the air supply or receiving chamber 70 relative to the pressure of oxygen in the passage 56 tends to move the valve 68 toward open position and a rise in pressure in the chamber 70 relative to that in the passage 56 tends to move the valve to closed position. The pressure in the chamber 70 is thereby maintained at a definite value relative to that in the passage 56.

Opposing the pressure exerted by the diaphragm 73 through the connector 72 is the pressure in the suit 51 near the vent valve 52 transmitted to the chamber 71 through a conduit 74 and the pressure of a spring 75 confined between the diaphragm 69 and the opposite end of the chamber 71. The spring 75 is selected to impose a pressure equal to from 3 to 4 inches of water. The combination of spring and suit pressures results in a vent pressure of the suit controlled at 4 to 5 inches of water above ambient atmospheric pressure.

In the event of failure of the aircraft air supply, oxygen at a much higher pressure will be supplied to the passage 19 and will react against the valve 68 and diaphragm 69. To compensate for this pressure, a bellows 76 is provided in the chamber 71 and is connected by a passage 77 to the passage 19. The pressure of the oxygen in the passage 19 will thus be transmitted to the bellows and will expand it until a stub on the end of the bellows presses against the diaphragm 69 with a pressure corresponding to the increased pressure in the conduit. This system maintains the suit supply pressure at a definite value relative to the oxygen supply to the helmet.

The pressure at which oxygen is supplied through the valve 55 to the conduit 61 is controlled by the pressure of the ambient atmosphere and a spring 60 in the chamber 59 which is open to the atmosphere through an opening 78 to a chamber 79 and openings 80 from the chamber to the atmosphere. The pressure of the spring is adjusted to maintain a pressure of from 7 to 9 inches of water above ambient atmospheric pressure, and about 3 to 4 inches of water above suit pressure.

When the aircraft reaches an altitude of 25,000 feet or slightly above the opening 78 is closed by a valve 81 actuated by an evacuated bellows 82 so that at all higher altitudes the pressure in the chamber 59 is constant and equal to the ambient atmospheric pressure at 25,000 feet or about 5.45 pounds per square inch. The valve 81 therefore closes at this pressure plus the pressure of the spring 60 which is set for 3 to 4 inches of water. The valve 68 then admits oxygen at a pressure of 5.45 pounds, 3 to 4 inches of water below the pressure in the passage 56. When the aircraft or the suit goes below 25,000 feet the valve 81 opens.

In each of the above embodiments, therefore, during normal flight oxygen is supplied from the supply 13, through the fixed part 12 of the emergency disconnect to the detachable part 20 past the valve 33, the control valve 55 to the conduit 61, the convenience disconnect 49, conduit 62, and inlet valve 64 to the helmet 63. Oxygen is exhaled through the outlet check valve against the combined pressure of the oxygen admitted through the branch 67 to the bellows, not shown, and the spring 66. Air is supplied from the aircraft supply past the valve 16 in the lower part of the emergency disconnect past the check valve 28 in the upper part of the emergency disconnect, thence through conduit 19, valve 39, of Figs. 2 and 3, or valve 68 of Fig. 4, to the conduit 48, convenience disconnect 49, and conduit 50 to the suit 51. Venting of the suit is through the valve 52 held to a definite release pressure by the spring 53 below 25,000 feet and by this spring and the evacuated bellows 54 above 25,000 feet. Above 25,000 feet the valve 46 is closed by the evacuated bellows 47 in Figs. 2 and 3, or the valve 81 is closed by the bellows 82 of Fig. 4, thereby supplying oxygen and air at constant pressures, the oxygen in all cases being at a higher pressure than the air.

On failure of the air supply valve 16 is closed and valve 22 opened by the diaphragm and oxygen is supplied from the passage 14 to the connecting passage 18. The higher supply pressure of the oxygen is compensated by its pressure on valve 39 of Figs. 2 and 3, and the system 77, and bellows 76, Fig. 4, to maintain the proper pressure differential between the passages 48 and 61, and to keep the pressure of oxygen supplied to the suit below the venting pressure of the valve 52.

When the pilot bails out the upper part 20 of the emergency disconnect separates from the lower part 12, valves 33 and 28 close, valve 36 opens, the emergency supply 32 is opened and both conduits 19 and 30 and the pressure regulator are supplied from the emergency oxygen supply and the apparatus operates similarly to its operation with the operation from the aircraft oxygen supply on failure of the air supply.

Having described our invention, what we claim is:

1. A control apparatus for supplying gases under pressure to the suits of aircraft personnel which comprises a disconnect device comprising a fixed part having an inlet air chamber, an oxygen chamber, a passage connecting said chambers and a valve in said passage controlled by the pressure in said air chamber to close said passage when the air in said air chamber exceeds a fixed minimum, and an upper part having an oxygen passage from said oxygen chamber to supply the helmet of said suit, an air passage from said air chamber to supply the body of the suit and a passage connecting said passages, a valve in said air and oxygen passages held in open position by said fixed part when said parts are connected and closing when said parts are disconnected, and a valve in said connecting passage held closed by said lower part and opening when said parts are disconnected, a pressure regulating mechanism having an air passage connected to the air passage of said upper part and an oxygen passage connected to the oxygen passage of said upper part, said oxygen passage in said pressure regulating mechanism having an oxygen control valve controlled by the pressure in the air passage of said pressure regulating mechanism to close said oxygen passage at a pressure fixed above the pressure in said air passage, an air control valve in said air passage in said pressure regulating mechanism and a control diaphragm for said control valve having a passage to the ambient atmosphere and a second control valve having a closed bellows acted on by the atmosphere to close said passage to the control valve when the ambient atmospheric pressure falls below that of said bellows.

2. The control apparatus of claim 1 in which said oxygen control valve has a moving element acted on by the pressure in said air passage controlled by the air control valve and by the oxygen pressure controlled by said oxygen control valve.

3. The control apparatus of claim 2 in which said moving element is a diaphragm on the exit side of said oxygen control valve and said control mechanism has a passage from the exit side of said air control valve to the opposite side of said diaphragm.

4. The control apparatus of claim 3 having a spring biasing said diaphragm and oxygen control valve to closed position.

5. The control apparatus of claim 1 in which the air chamber of said fixed part has a diaphragm connected to the valves in said air chamber and connecting passage and exposed on one side to air in said air chamber and on the opposite side to the ambient atmosphere.

6. Aircraft apparatus comprising a suit, a helmet for aircraft personnel and a control apparatus to control the supply of oxygen to said helmet and of air to said suit and comprising a disconnect comprising a fixed part having an air chamber, an oxygen chamber, a connecting passage between said chambers, a valve opening from said air chamber, a valve in said connecting passage and an operating element subject to ambient atmospheric pressure and acted on by the pressure in said air chamber to open the valve passage from said air chamber and close the valve in said connecting passage when the air pressure in said air chamber exceeds the ambient atmospheric pressure by a limit value and a detachable part having an air passage leading from said air chamber, an oxygen passage leading from said oxygen chamber and a passage connecting said passages, closure valves one in said air passage and one in said oxygen passage held open by contact with said fixed part and a valve in said connecting passage held closed by said fixed part and opening upon separation of said parts, an oxygen conduit from the oxygen passage of said detachable part, to the helmet of said suit, an air conduit from the air passage of said detachable part to the body of said suit, a control mechanism in said passages having a control valve controlling the passage through said air conduit and acted on by the ambient atmosphere to close when the pressure on the exit side of said valve exceeds the ambient atmospheric pressure by a limit value, and having a second control valve controlling the passage through said oxygen passage and acted on by the pressure of gas on the exit side of said first control valve to close said valve when the pressure of oxygen on the exit side of said second valve exceeds the gaseous pressure on the exit side of said first control valve by a limit value, and pressure release valves in said helmet and body of said suit, respectively.

7. The apparatus of claim 6 in which the second control valve comprises a diaphragm acted one one side by a spring and the gas under pressure admitted from the exit side of the first control valve and on the opposite side by oxygen on the exit side of the second control valve.

8. The apparatus of claim 7 in which said first control valve comprises a diaphragm acted on by a spring and ambient pressure to close said valve and on the opposite side by the gas on the exit side of said valve.

9. The apparatus of claim 8 in which the control apparatus has a valve to close the diaphragm from communication and a closed expansible element exposed to close said valve and acted on by the ambient atmospheric pressure to open said valve when the pressure of said ambient pressure exceeds that of said closed expansible element.

10. Apparatus for supplying oxygen and air under controlled pressure to a helmet and suit for aircraft personnel which comprises a disconnect comprising a fixed part and a separable part, said parts having an air passage and an oxygen passage therethrough, a connecting passage in each of said parts and an emergency oxygen inlet to said oxygen passage in said separable part, valves in said passages to open the connecting passage in the fixed part when the pressure in the air passage is below a lower limit, and to close the entrances of the air and oxygen passages of the separable part and open the connecting passage therein when the separable part is disconnected, a control mechanism comprising a valve controlling the passage of oxygen from the separable parts to the helmet to supply oxygen at a fixed pressure above the ambient pressure and a valve to supply gas from the air passage to the suit at a pressure above ambient atmospheric pressure and lower than the pressure supplied to the helmet.

References Cited in the file of this patent
UNITED STATES PATENTS

| | | |
|---|---|---|
| 2,307,393 | Crowley | Jan. 5, 1943 |
| 2,703,572 | Seeler | Mar. 8, 1955 |